United States Patent [19]

Hauser

[11] Patent Number: 4,717,633
[45] Date of Patent: Jan. 5, 1988

[54] ELECTRODE STRUCTURE FOR LIGHTWEIGHT STORAGE BATTERY

[76] Inventor: Eric Hauser, 63-184 Alderton St., Rego Park, N.Y. 11374

[21] Appl. No.: 777,708

[22] Filed: Nov. 25, 1985

[51] Int. Cl.⁴ .................. H01M 4/02; H01M 4/72
[52] U.S. Cl. .................. 429/209; 429/234; 429/238
[58] Field of Search .................. 429/234, 238, 209

[56] References Cited

U.S. PATENT DOCUMENTS

| | | | |
|---|---|---|---|
| 2,616,938 | 11/1952 | Brandt | 429/234 X |
| 3,269,863 | 8/1966 | Helms | 429/234 X |
| 3,902,916 | 9/1975 | Warszawski | 429/206 X |
| 4,256,813 | 3/1981 | Kniazzeh | 429/152 X |
| 4,427,748 | 1/1984 | Land | 429/201 X |
| 4,476,206 | 10/1984 | Viala et al. | 429/234 |
| 4,535,040 | 8/1985 | Kline | 429/234 |

FOREIGN PATENT DOCUMENTS

| | | | |
|---|---|---|---|
| 58-175767 | 7/1983 | Japan | 429/234 |
| 58-223266 | 12/1983 | Japan | 429/234 |

Primary Examiner—Brian E. Hearn
Assistant Examiner—Stephen J. Kalafut

[57] ABSTRACT

The plate of a storage battery such as a lead acid battery is made from a reinforcing plastic substrate on which a thin layer of active metal is formed. The plastic substrate is stronger than the thin metal layer so that size and weight reduction is possible with concurrent improvement of structural reliability and life expectancy.

14 Claims, 10 Drawing Figures

ELECTRODE STRUCTURE FOR LIGHTWEIGHT STORAGE BATTERY

FIELD OF INVENTION

The present invention relates to electrical storage batteries. More specifically it concerns an improved structure for the electrode plates of a storage battery such as a lead-acid battery.

BACKGROUND OF INVENTION

Attempts have been made over the years to develop a lightweight electric battery for use in automobiles and other transportable applications. Of the various batteries developed to date, none offers the price/performance advantage available from the lead-acid battery (accumulator). Such a battery though, is very heavy. It uses plates made from lead which being a heavy material, adds significantly to the total weight of the battery. Lighter metals have been substituted but these could not match the price/performance ratio of the conventional lead-acid battery. Lead was found to be essential if the original storage density and charge/discharge rates were to be preserved.

The electrode of a conventional metal-acid battery are formed as plates spaced apart and immersed in an acid solution such as diluted sulfuric acid. For improved discharge characteristics, a so-called pasted plate is used which comprises a grid to which a paste containing an active mass is applied. FIG. 1 shows the structure of a grid from such a plate. The grid is made from a sheet 1 of active metal such as antimony lead in which a plurality of holes 2 are formed, defining grid elements 3 therebetween. A paste 4 comprising of an active mass such as lead oxide for example, is applied to fill the holes 2 and react with the grid elements 3. The combination of active mass and grid form the pasted plate shown in cross section in FIG. 2. In addition, the sheet 1 is provided with a terminal portion 5 for conducting electric current to and from the grid elements 3.

The grid functions as a structural frame for giving the pasted plate its shape. The outer surface 6 of each grid element 3, as indicated by the dotted lines in FIG. 2 contacts and reacts with the paste 4. Electrical current is carried by the grid between the reaction surface 8 and the terminal 5.

Conventionally, battery weight is reduced by making the grid sheet 1 as thin as possible since only the surface 6 (as indicated by the dotted lines in FIG. 2) of the grid elements reacts with the active mass 4. The grids can be made as thin as 3 mm. Further reduction was not possible because lead is a weak material. If made substantially thinner, the grid would break when the battery is subjected to vibration such as a severe jolt from the roadway or from mechanical shock due to high current charging and discharging. Even at the present thickness, batteries are not reliable when subjected to severe roadshock and they age quickly when cycled through high current charging/discharging.

Weight reduction is desirable for employment of such storage batteries (accumulators) in electric vehicles, hybrid vehicles and the like because energy efficiency is improved. Stationary applications benefit from weight reduction as well since the structural requirements of a building which houses a power back up system using storage cells such as a hospital for instance, may be reduced when the weight of the cells is reduced.

OBJECTS AND SUMMARY OF THE INVENTION

It is an object of the present invention to reduce the amount of metal used in a battery electrode and more specifically the amount of grid lead in a lead acid battery and thereby reduce the weight of the battery in which such an electrode is used. It is another object to provide an electrode capable of withstanding severe vibration. It is yet another object to provide a grid which can be made very thin so that the overall size of the battery can be reduced.

In accordance with the present invention, an electrode is formed of a thin layer of active metal, such as lead, coated on a stronger and lighter substrate, such as a plastic sheet. The substrate is inert with respect to the cell electrolyte (acid) so that its structural integrity is never jeopardized and it can reliably support a very thin layer of active metal deposited thereon. Preferably the plastic is electrically conductive and somewhat flexible. By replacing the cross-sectional core of a metal electrode with a lighter and stronger material, in accordance with the present invention, a lighter yet stronger battery structure is obtained.

BRIEF DESCRIPTION OF THE DRAWINGS

FIG. 5(a) shows a cross sectional view of another embodiment according to the invention.

DETAILED DESCRIPTION

Figure 1:
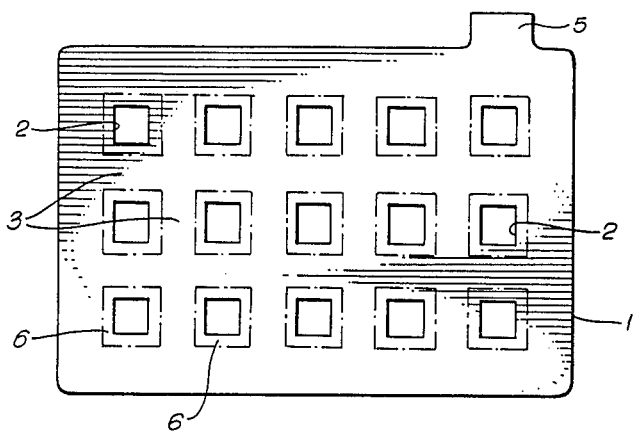
FIG. 1 is a top plan view of a grid according to the prior art.
Figure 2:
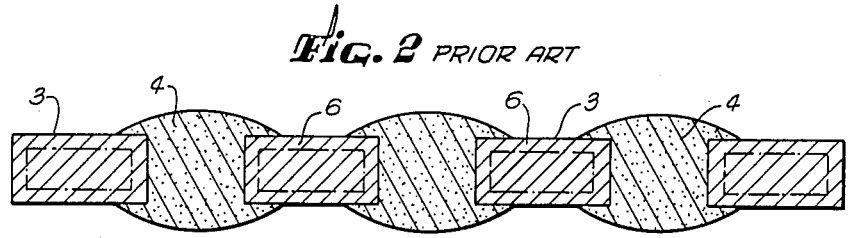
FIG. 2 is an enlarged cross sectional view of a portion of the grid shown in FIG. 1 after paste is applied.
Figure 3:
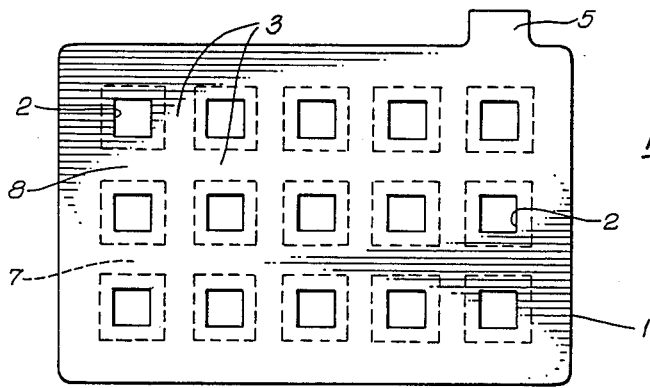
FIG. 3 is a top plan view of a grid according to the present invention.
Figure 4:
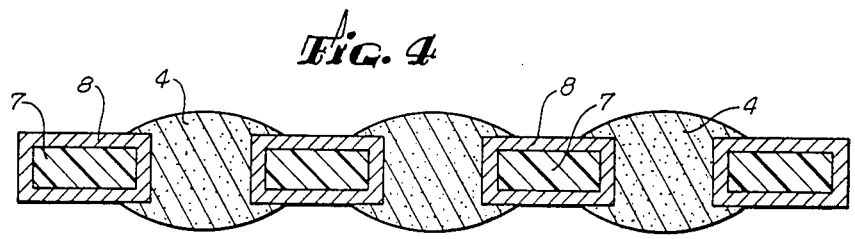
FIG. 4 is an enlarged cross sectional view of a pasted grid according to the present invention.

Referring to FIG. 3 and FIG. 4, a grid according to the present invention is constructed of a plastic substrate 7, which can be a plastic sheet such as used for photographic film, having a thickness of approximately 0.03 mm. The sheet is formed to have a similar shape as that of the prior art sheet 1, including holes 2 and a terminal portion 5. A thin layer 8 of active metal (antimony lead) is then deposited on the plastic substrate. The lever 8 is preferably on the order of 0.01 mm so that the overall thickness of the grid is 0.05 mm as compared with the 3.00 mm or thicker grids of the conventional structure. Active mass in the form of a paste 4 is applied to the holes and grid elements, covering the reaction surface 8. It should be noted that the paste is also of a smaller thickness because its supporting grid is thinner.

The plastic substrate is stronger and lighter than lead. Therfore the weight of the grid is reduced while its strength is improved. The plastic will not break even under severe shock so that this plastic reinforced grid is able to withstand shocks (from the roadway and charging cycle) which the prior art grid could not. Preferably the plastic is flexible enough to withstand vibration but otherwise retains its grid-like form. The effective conductance of the active metal layer 8 is sufficient to handle a few amps of current but it can be improved by using a conductive plastic such as one having carbon particles dispersed therein. Electrical (conduction between the grid elements 3 and the terminal portion 5 then takes place through the conductive substrate 7 as well as the active metal layer 8. Additionally, a conductive substrate 7, permits easy formation of the active metal layer 8 thereon by electroplating. Electroless methods such as sputtering may be used to form the active metal layer 8 when the substrate is nonconductive.

Figure 7:
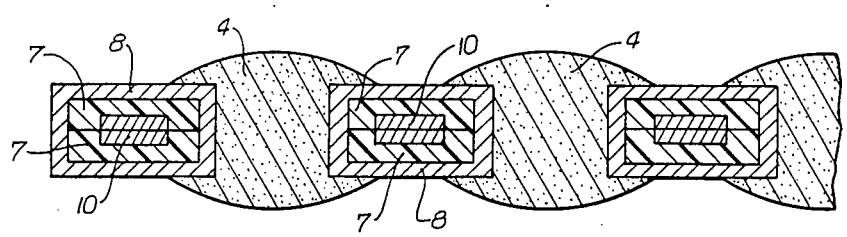
FIG. 7 shows a cross sectional view of a three layer embodiment according to the invention.

FIG. 7 shows another embodiment of a plastic reinforced grid having an outer active metal layer 8 disposed on a conductive plastic layer 9 which encloses a copper layer 10 to protect the latter from the battery acid. The copper layer 10 improves electrical conductivity of the grid and provides for more uniform heat distribution. However the copper core 10 adds weight and thickness to the grid. Moreover, manufacturing costs are increased by its addition. It is imperative that the copper is not allowed to be attacked by the electrolytic acid since this will destroy the cell. A conductive sheet 9 is first plated on one side with copper expect around the holes 2 and then the sheet is folded to enclose the copper as a middle layer. The sheet edges and the hole peripheries are sealed to completely enclose the copper. Lead is then plated to the outer surface of the folded sheet.

Figure 5:
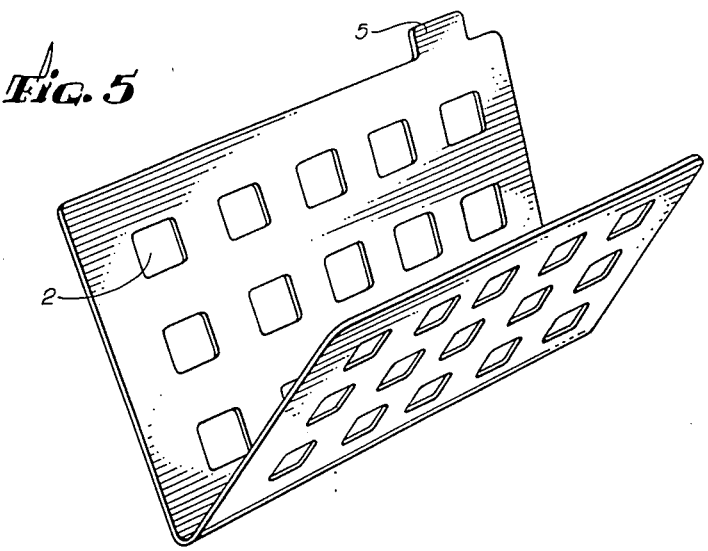
FIG. 5 is a perspective view showing assembly of a folded pouch embodiement according to the invention.

FIG. 5 illustrates a method for pasting a grid made according to the invention. The grid is made of a semiflexible plastic substrate, coated with a thin layer of lead and folded into the shape of a V. Paste 3 is deposited into the V and a pouch is formed by heat sealing the edges. The pouch is then pressed flat to distribute the paste evenly through all the grid holes 2.

Figure 6A:
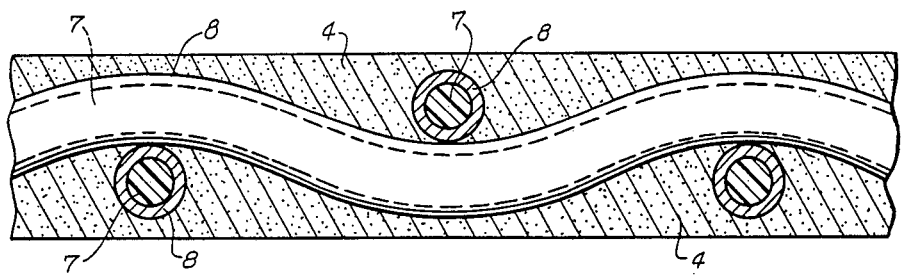
FIG. 6(b) shows two electrodes of the invention rolled together
Figure 6B:
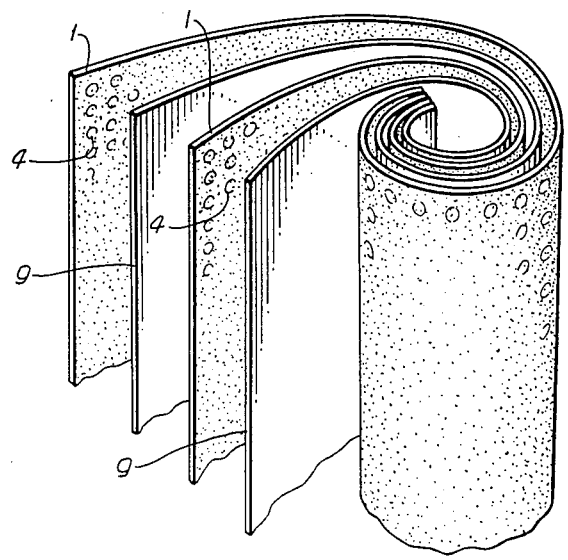

FIG. 6(a) shows in cross section yet another embodiment of the invention wherein the plastic substrate 7 is in the form of a wire. The active metal layer 8 is formed on the wire core and the wire is woven into a mesh. Paste 4 is then worked into the spaces in the mesh. The mesh is too flexible for use in plate form. Instead, a separation membrane 9 is sandwiched between two mesh sheets and a second one is applied over the three. The membrane separated sheets are rolled into a cylinder which is then inserted into acid to form one cell of a battery.

Figure 8:
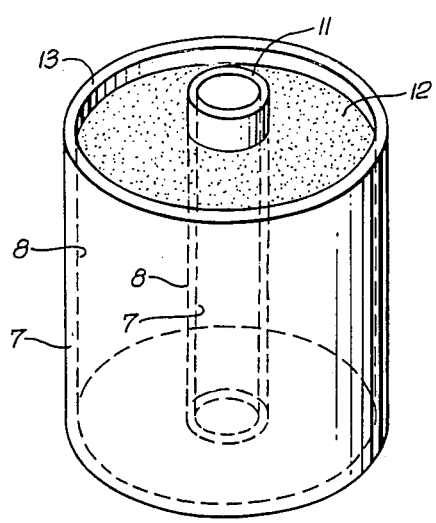
FIG. 8 is a perspective view of another embodiment of the invention.

While the forgoing describes a lead-acid battery, the invention should not be thus limited. Batteries having other active metals electrodes such as nickel-iron and zinc-copper galvanic cells may also be improved by substituting a plastic reinforced thin layer for the solid metal electrode conventinally used. FIG. 8 shows a cylindrical cell in which the central electrode 11 normally made of a solid zinc rod and the outer electrode 13 normally made of a thick copper sheet, are replaced by plastic structures according to the present invention having a thin layer of the active metal deposited thereon. An electrolyte 12 is in between the two electrodes.

Figure 9:
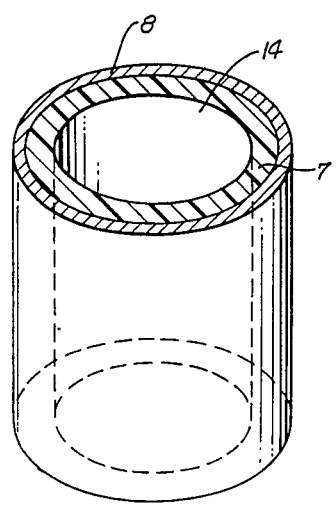
FIG. 9 is a perspective view of another embodiment of the invention.

FIG. 9 shows a hollow tube formed according to the present invention. The substrate 7 may be formed by extrusion or casting. In stationary applications where size is not important, the substrate 7 is made stronger by forming it with a hollow core 14. A cooling fluid may be passed through the hollow core 14 when used for instance in high temperature environments such as for back up of electrical utility plants. Other embodiments as shall occur to those skilled in the art are also contemplated in accordance with the spirit of this invention. Accordingly as described above and claimed hereinafter, there is provided an electrode structure of reduced weight, improved resistance to mechanical vibration or shock, and reduced dimensions.

I claim:

1. An electrode for use in a battery comprising a thin layer of active metal provided on a substrate which is made of a material lighter and stronger than the active metal layer, wherein the substrate includes an electrically conductive plastic layer and the active metal layer is electrolytically bonded to a surface of the substrate; and a copper core protectively enclosed by the substrate such that the copper core is protected from attack by a predetermined electrolytic solution when the electrode is immersed in the electrolytic solution.

2. An electrode according to claim 1 wherein the conductive plastic layer is located at the surface of the substrate and is connected electrically to the active metal layer.

3. An electrode according to claim 2 wherein the conductive plastic layer includes a synthetic resin with carbon particles distributed therein.

4. An electrode according to claim 1 wherein the active metal layer includes lead.

5. An electrode according to claim 1 wherein the substrate is in the form of a sheet having holes therethrough.

6. An electrode according to claim 5 wherein the edges of the sheet are sealed to form a pouch, and the pouch includes a paste of active mass distributed therein.

7. An electrode according to claim 1 wherein the active metal layer is less than 3 millimeters thick.

8. An electrode according to claim 1 wherein the substrate is in the form of a wire which is surrounded by the active metal layer.

9. An electrode according to claim 8 wherein the wire is formed into a mesh.

10. An electrode for use in a battery comprising a thin layer of active metal provided on a substrate which is made of a material lighter and stronger than the active metal layer, wherein the substrate includes an electrically conductive plastic layer and the active metal layer is electrolytically bonded to a surface of the substrate; and wherein the substrate has a hollow core.

11. An electrode for use in a battery comprising a thin layer of active metal disposed on a supportive substrate, wherein the supportive substrate is made of a material that is lighter and stronger than the active metal layer, and wheren the supportive substrate has a hollow core portion.

12. An electrode according to claim 11 wherein the hollow core portion of the substrate is adapted to conduct a cooling fluid therethrough.

13. An electrode for use in a battery comprising a thin layer of active metal disposed on a supportive substrate, wherein the supportive substrate is made of a material that is lighter and stronger than the active metal, the supportive substrate is in the form of a wire, and the active metal layer encircles the substrate uniformly; and wherein a copper wire is provided at the core of the supportive substrate and the substrate protects the copper wire from attack by a predetermined electrolytic acid solution.

14. An electrode for use in a storage cell according to claim 13, wherein the substrate is made of a conductive plastic which is impervious to a predetermined electrolytic solution of the storage cell and which connects the copper wire electrically to the active metal layer.

* * * * *